(12) United States Patent
Vezzoli

(10) Patent No.: US 10,518,340 B2
(45) Date of Patent: *Dec. 31, 2019

(54) AUTOMATIC DEVICE FOR LOCKING TOOL-HOLDERS ON LATHES AND MACHINES WHICH PERFORM MACHINING WITH CHIP REMOVAL

(71) Applicant: ALGRA S.P.A., Val Brembilla (BG) (IT)

(72) Inventor: Giovanni Vezzoli, Via Brembilla (IT)

(73) Assignee: ALGRA S.P.A., Val Brembilla (BG) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,216

(22) Filed: May 9, 2018

(65) Prior Publication Data

US 2018/0326511 A1 Nov. 15, 2018

(30) Foreign Application Priority Data

May 15, 2017 (IT) .................................. MI17A2288

(51) Int. Cl.
*B23C 5/26* (2006.01)
*B23B 29/34* (2006.01)

(52) U.S. Cl.
CPC ................ *B23C 5/26* (2013.01); *B23B 29/34* (2013.01); *B23C 2240/32* (2013.01); *B23C 2260/04* (2013.01)

(58) Field of Classification Search
CPC ..... B23C 5/26; B23C 2240/32; B23B 29/046; B23B 29/26; B23B 29/34; B23B 29/244; B23B 31/1073; B23Q 3/1556
See application file for complete search history.

(56) References Cited

U.S. PATENT DOCUMENTS 10,160,044 B2 * 12/2018 Vezzoli ................. B23B 31/107

OTHER PUBLICATIONS

IT201700052288, Italian Search Report dated Jan. 25, 2018, 8 pages.

* cited by examiner

*Primary Examiner* — Alan Snyder
(74) *Attorney, Agent, or Firm* — Abelman, Frayne & Schwab

(57) ABSTRACT

An automatic device for locking of tool holders (12) on lathes and machinery performing machining by chip removal, particularly suitable to be used on multi-spindle and single spindle CNC lathes, on transfer machines, milling centres of any kind and, in general, on all types of machine tools which perform machining by chip removal, comprises a support body (14) anchored to the machine tool and surmounted by a plate (16), said device comprises, for each of said tool-holders (12), a pawl (18) provided with a female truncated-cone recess (24), cooperating with a nut screw (36) and moved automatically vertically to engage in contact with a truncated cone collar appendage (40) made in a recess (38) in the rear (12'). The movement in the vertical direction of the pawls (18) is produced by means of individual motors (46), equipped with a shaft (48) which protrudes from their lower face and engages to the upper end of said nut screw (36).

10 Claims, 3 Drawing Sheets

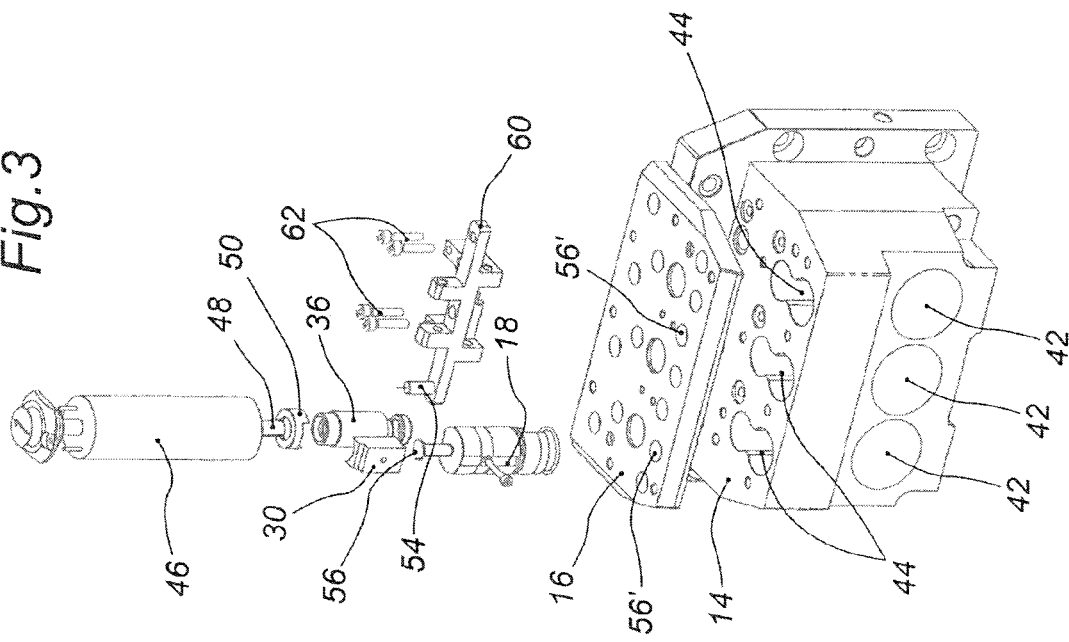
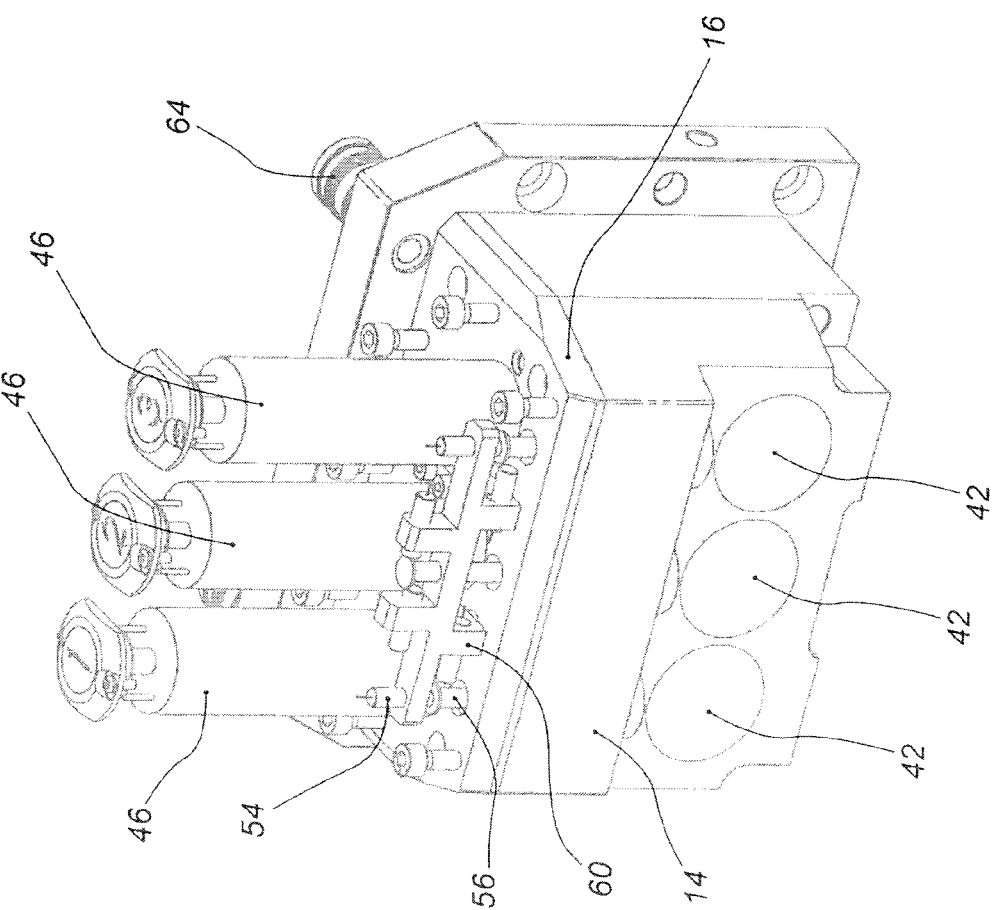

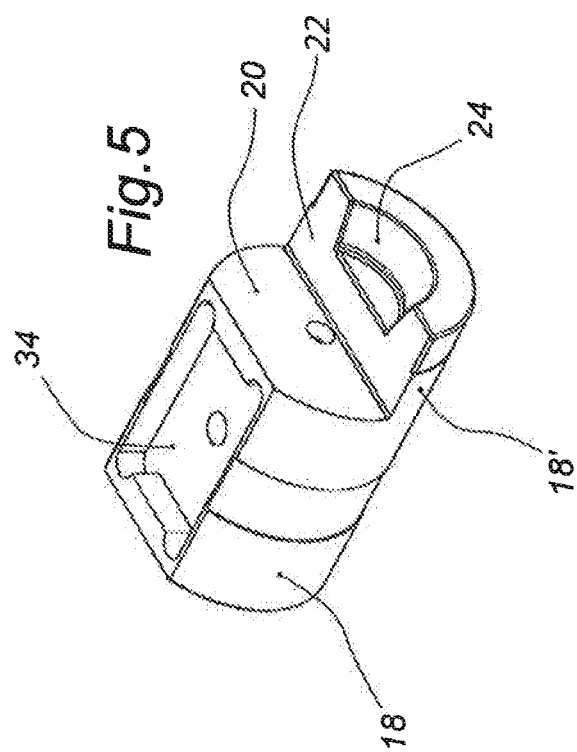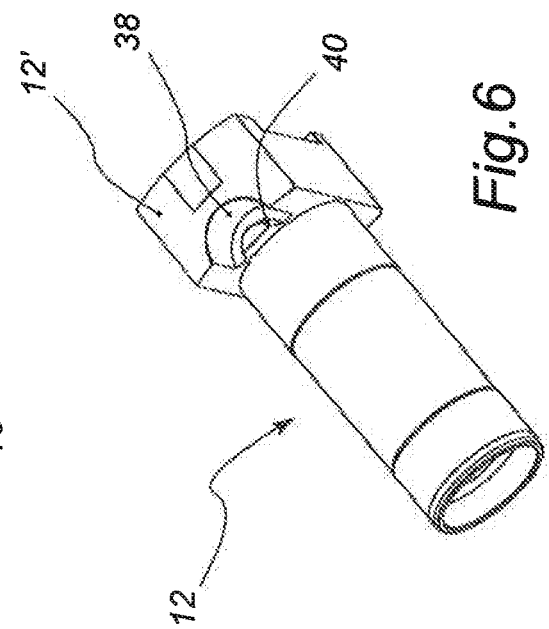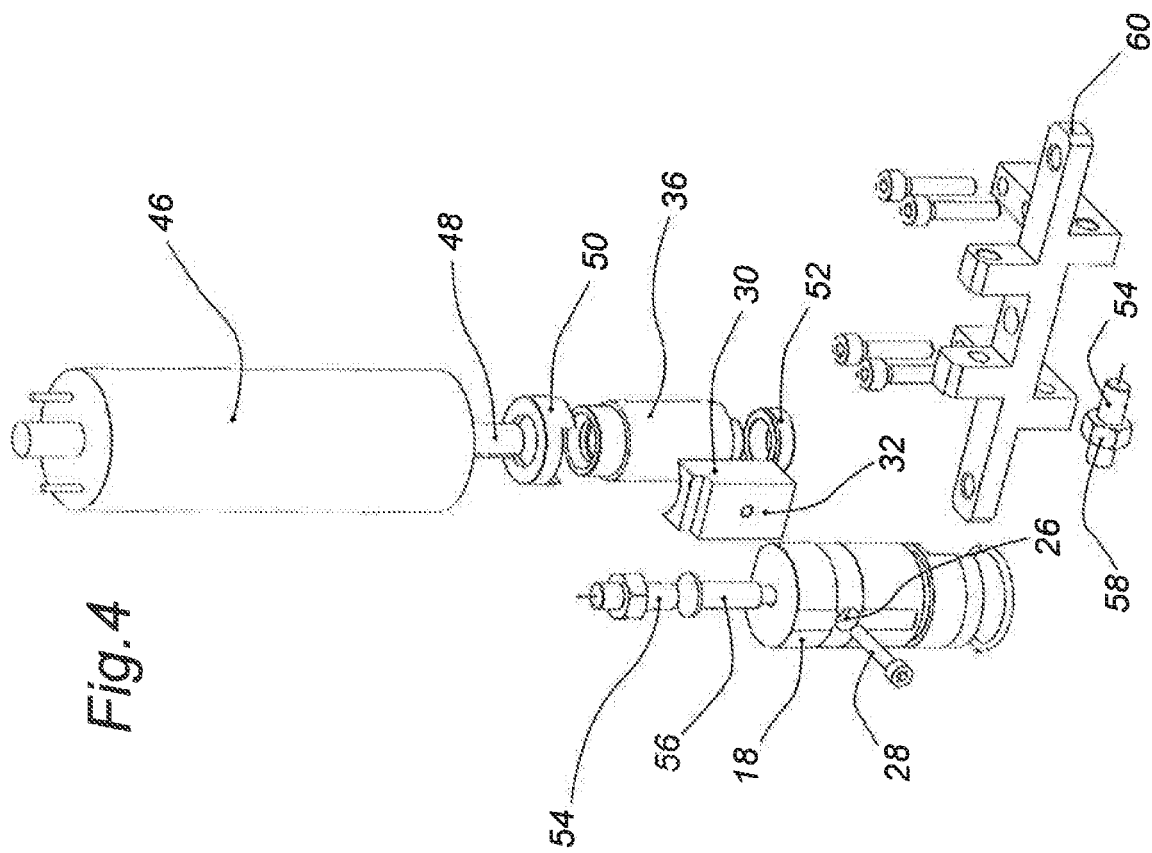

AUTOMATIC DEVICE FOR LOCKING TOOL-HOLDERS ON LATHES AND MACHINES WHICH PERFORM MACHINING WITH CHIP REMOVAL

The present invention relates to an automatic device for locking tool-holders on lathes and machines which perform machining with chip removal.

More in particular, the present invention relates to an automatic device which allows the fast and safe locking and unlocking of motorised or non-motorised tool-holders on CNC single-spindle or multi-spindle lathes, on transfer machines, milling centres of any kind and, in general, on machine tools which perform machining by chip removal.

It is known that in the context of mechanical machining carried out with CNC machine tools of any kind there is a need to frequently replace the various modules, as needed at the time to obtain the required pieces.

Repeated equipment replacement operations involve downtimes, where the operation of the machine is compulsorily suspended for a given period; it is also necessary to consider set-up times at each tool replacement. In the case of machinery using multiple tool-holders, their replacement involves intervention on multiple screws for blocking and centring positioning. These repeated and sometimes awkward manual operations thus altogether give rise to significant increases in overall production costs.

In order to overcome these drawbacks, the same applicant has designed a solution which, by means of a particular device, makes it possible to make the replacement of the tool-holders extremely quick and easy; said device was the subject of the Italian patent application no. 102017000013072 filed on 7 Feb. 2017, recalled in the context of the present description. However, it has been found that the device according to the application referred to, although perfectly functional and able to achieve the stated advantages, has some drawbacks, which relate in particular to the operator involved in the replacement of the various tool-holders. The same must in fact operate in close contact with the machine, with the consequence of continuously soiling his/her hands due to the lubricants and refrigerants used in the production cycle, substances which may even strike other parts of the body and even the face with drops and accidental squirts. In addition, continuous interventions with spanners on means suitable to lock and unlock the tool-holders may prove awkward and strenuous, given that this usually involves operating with arms stretched and overhanging.

JP S59 59303 in the reference sector discloses a device for locking tool-holders on lathes, comprising a support body anchored to the machine tool and provided, for each of said tool-holders, with a pawl with a toothing forming an advancing bar, moved automatically in a vertical direction and suitable to engage with a complementary toothing made in the rear of each of said tool-holders; in this solution there is no possibility of an alternative positive locking of the tool-holders on the support body.

U.S. Pat. No. 5,873,682 relates to a tool-holder for a cutting insert, comprising a body with a channel made in it to receive a pawl which extends from a head and is fixed inside said channel by means of an assembly screw; said screw allows the head to move only between a retracted position and an extended position relative to the body.

The purpose of the present invention is to overcome the aforesaid drawbacks.

More particularly, the purpose of the present invention is to provide an automatic device for locking tool-holders on lathes and machines which perform machining with chip removal suitable to allow the operator to carry out the relevant operations, with a view to replacing the tool-holder, remaining in a position suitably distant from the areas where said tool-holders are placed.

A further purpose of the invention is to provide a device designed to prevent the operator from having to performing repeated awkward and strenuous operations to replace the tool-holder.

A further purpose of the invention is to provide a device as defined above suitable to perform automatic centring of the replaced tool-holder, avoiding the need for laborious adjustments after its replacement as regards orientation and positioning in the four degrees of movement, i.e. along the X, Y, and Z axes and angularly.

A further purpose of the invention is to make available to users an automatic device for locking tool-holders to lathes and machines which perform machining with chip removal able to ensure a high level of resistance and reliability over time, in addition such as to be easily and economically made.

These and other purposes are achieved by the automatic device for locking tool-holders of the present invention according to the main claim.

The construction and functional characteristics of the automatic device for locking tool-holders, of the present invention will be more clearly comprehensible from the detailed description below in which reference is made to the appended drawings which show a preferred and non-limiting embodiment and wherein:

FIG. 1 schematically represents an axonometric view of the automatic locking device of the present invention;

FIG. 2 schematically represents an axonometric view of a part of the device according to FIG. 1, to highlight the coupling seats of the tool-holders and the locking/unlocking means connected to them;

FIG. 3 shows schematically, in an exploded view, a part of the device in the previous figure;

FIG. 4 shows schematically and in detail a part of the device in the previous figure;

FIG. 5 shows schematically an enlarged axonometric view from a different angle of a component, of the device according to the invention, destined to co-operate with said tool-holder;

FIG. 6 represents schematically an axonometric view of the tool-holder in FIG. 1.

Figure 1:
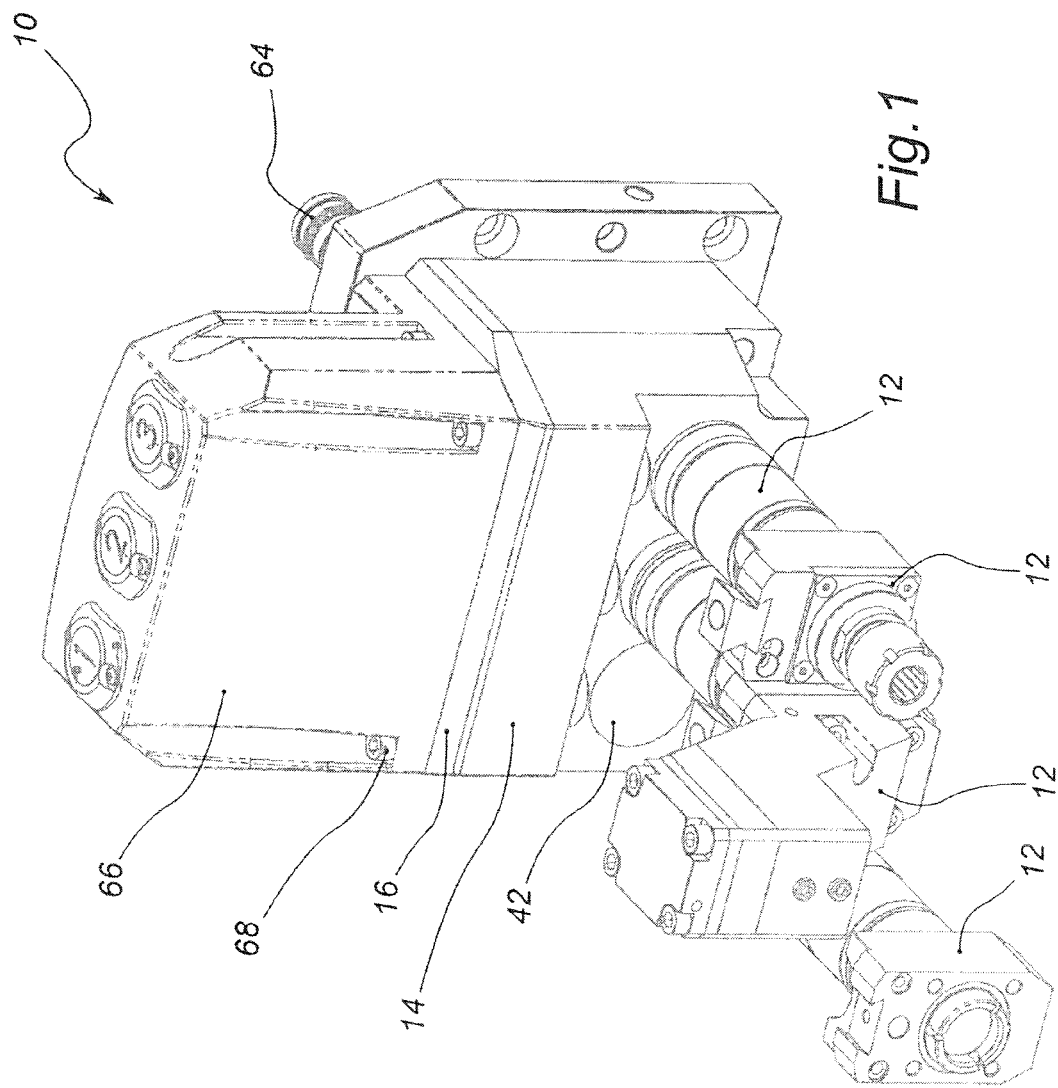

With initial reference to FIGS. 1 and 2, the automatic device for locking tool-holders to lathes and machines which perform machining with chip removal of the present invention, globally denoted as reference numeral 10 in FIG. 1, is coupled to one or more tool-holders 12, in themselves known, connected to a conventional support body 14 anchored to the machine, whether a lathe, a transfer machine, a milling centre or even a machine tool performing machining with chip removal. One of said tool-holders 12 is shown in detail in FIG. 6. The support body 14 is surmounted by a plate 16 described further below.

The automatic locking device of the present invention comprises at least one pawl 18, illustrated in detail in FIG. 5, consisting of a substantially cylindrical body in which one face is devoid of a diametrical half-part and forms a plane 20 tendentially semi-circular. The remaining diametrical half-part of the pawl 18, indicated by reference number 18' comprises a vertical wall 22, orthogonal with respect to said plane 20, on which a female truncated-cone shaped recess 24 is made: the recess 24 extends from the top of the vertical wall 22 for a height roughly equal to half the height of said wall. The anchoring pawl 18 comprises a transversal through hole 26 (FIG. 4) which houses a screw 28 adapted to connect said pawl to a body 30 of an irregular prismatic shape; said body 30, in which an exposed face 32 has a quadrangular extension, defines a threaded leadscrew, with internal trapezoidal thread. A portion of the anchoring pawl 18 has a flattening which a recessed imprint 34 is made on, as shown in detail in FIG. 5; said imprint defines a profile and an extension complementary to the shape of the exposed face 32 having a quadrangular extension of the body or of the threaded leadscrew 30, which positions itself exactly in the imprint to be firmly connected, and without the possibility of angular movements, to the pawl 18 by means of said screw 28.

The automatic device for locking tool-holders 12 to lathes and machines which perform machining with chip removal according to the present invention further comprises at least a nut screw 36, provided with an external trapezoidal thread destined to face the corresponding trapezoidal thread, made on the body 30, engaging with it, as further specified in relation to the operation of said device. Each of the tool-holders 12 combined with the device according to the invention is advantageously provided, in its rear part indicated by reference numeral 12' constituting the coupling intended to be anchored to the lathe or the machine in general, with a truncated-cone shaped recess 38. This recess is advantageously made by means of a double drilling with different diameters in a vertical sense on said rear part 12'. At the base of the recess 38, as can be seen in particular in FIG. 6, the formation of a truncated cone shaped collar appendage 40 results, destined to engage in the truncated cone female recess 24 of the anchoring pawl 18 when this is made to lower. This lowering is performed by means of a motor with a planetary gear reducer 46, fitted with a shaft 48 protruding from the lower face and engaging with the upper end of the nut screw 36, with the interposition of a guide bushing 50; a similar bushing 52 is positioned at the base of the nut screw 36. The bushings 50 and 52 carry out an anti-seizing function and retention in the guide of the nut screw 36 during the rotation movement of the same, imposed by the motor 46. The rotation of the nut screw 36 leads the threaded external part to move the pawl 18, lifting or lowering it depending on whether the rotation is clockwise or anti-clockwise, by means of the threaded leadscrew 30 to which the pawl is constrained by the screw 28.

Proximity sensors 54 are advantageously provided, two for each motor 46, suitable to detect the stroke performed, typically equal to about 4 or 5 millimetres, and therefore the position reached by the pawls 18; the latter are provided for the purpose with a peg 56, which is constrained to their top face and protrudes from special openings 56' made in the plate 16. After the pawls 18 have reached the position envisaged, the respective peg 56 sends an electromagnetic signal to the sensors 54, which block the movement. The proximity sensors 54 are fixed by nuts 58 or equivalent means to respective supports 60; the latter are in turn constrained to the plate 16 with screws 62, as shown in FIGS. 2 and 3. The support body 14 is provided at the rear with connection means 64, suitable for the passage of electrical cables that activate the motors 46 and manage the signals coming from the sensors 54 for moving the pawls 18 that lock or unlock the tool-holders 12.

In the support body 14, the tool-holders 12 are manually inserted with a horizontal orientation into the seats provided for such purpose, schematized with reference numeral 42 in FIGS. 1, 2 and 3; any number of tool-holders may be provided for. The same support receives, in conjunction with each of the tool-holders 12, a pawl 18 with threaded leadscrew 30 and a nut screw 36; the different groups of said elements 18, 30 and 36 are inserted at a pre-ordained height in the support body 14 starting from respective upper shaped openings 44, shown in FIG. 3. The insertion into the support body 14 of a tool-holder 12 takes place manually, but its locking in a stable and correct position is carried out automatically, by effect of the lowering of the pawl 18, the female truncated-cone female recess 24 of which engages in contact with the truncated cone collar appendage 40 made in the rear part 12' of the tool-holder 12. To carry out these operations, the operator needs only activate from a keypad the key corresponding to the position of the tool-holder in question, in order to activate, by specific and known electrical connection, the respective motor 46 which imposes on the nut screw 36 a rotation for example clockwise and leads to the lowering of the pawl 18 to the desired height and piloted by the sensors 54. Conversely, wishing to unlock the tool-holder 12 for its replacement, the pawl 18 is made to rise by effect of the opposite rotation from the previous, imposed on the nut screw 36 by the motor 46.

The motors 46 shown in FIG. 2 are shielded, as shown by way of example in FIG. 1, by a protective cover 66, which bears on the top side the reference and position numbers of the various tool-holders; said cover being stabilized on the plate 16 with allen screws 68 or the like.

As may be seen from the above, the advantages which the invention achieves are evident.

The replacement together with the automatic and targeted centring of tool-holders 12 on multi-spindle and single-spindle numerical control lathes, on transfer machines, milling centres of any kind and, in general, on machine tools which perform machining by chip removal is carried out extremely quickly and with absolute precision, avoiding the need for laborious adjustments as to the orientation of said tool-holders after their replacement. In fact, thanks to the possibility of realizing a coupling that takes place along truncated conical portions, the replacement and subsequent steps of orientation, locking and precise positioning in the four degrees of movement of the "X", "Y", "Z" and angular axes of the replacement tool-holders 12, whether motorized or non-motorized, are quickly and very easily performed, all to the advantage of a substantial reduction in downtime and consequently of production costs; the operator in charge also has the sole task of removing the already unlocked unit to be replaced from the machine and inserting a different unit in the same seat, then pressing the relevant button; in addition to excluding any risk of contamination from the diffuse presence of lubricants and refrigerants, the operator will not be subjected to repeated strain to perform with spanners, in close contact with the machine or its parts, the continuous and awkward manual operations of locking and unlocking the tool-holders.

Even with these significant advantages achieved by the invention, there is a further and concrete possibility that even the simple steps of removal of the unit to be replaced and positioning of the replacement unit can be performed automatically, for example by means of an anthropomorphic robot or with the aid of a robotic arm, so as to fully exclude the need for direct intervention by the operator on the machine.

Despite the invention having been described above with reference to one of its possible embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

The invention claimed is:

1. An automatic device for locking tool-holders (12) on lathes and machinery performing machining by chip removal, for use on multi-spindle and single spindle CNC lathes, on transfer machines, milling centres of any kind and, in general, on all types of machine tools which perform machining by chip removal, comprising a support body (14) anchored to the machine tool and surmounted by a plate (16), characterised in that it comprises, for each of said tool-holders (12), a pawl (18) provided with a female truncated-cone recess (24), cooperating with a nut screw (36) and moved automatically in a vertical direction to engage in contact with a truncated cone collar appendage (40) made in a recess (38) made in the rear part (12') of each of the tool-holders (12).

2. The locking device according to claim 1, characterized in that the vertical movement of the pawls (18) is achieved by individual motors (46) with planetary gear reducers, fitted with a shaft (48) protruding from their lower face and engaging with the upper end of said nut screw (36), the latter being provided with an outer trapezoidal thread intended to face and engage with the corresponding trapezoidal thread made on a threaded body or leadscrew (30) constrained to the pawl (18) by a screw (28).

3. The locking device according to claim 2, characterised in that the pawls (18) define a substantially cylindrical body in which one face is devoid of a diametrical half-part and forms a tendentially semi-circular plane (20), the remaining diametrical half-part (18') of the pawl (18) being provided with a vertical wall (22), orthogonal to said plane (20), on which said female, truncated-cone shaped recess (24) is made.

4. The locking device according to claim 3, characterised in that the pawls (18) comprise a flattening on which a recessed imprint (34) is made having a profile and extension complementary to the shape of the exposed face (32) of the threaded leadscrew (30).

5. The locking device according to claim 3, characterised in that each of the pawls (18) is provided with a pin (56), constrained to the upper face and protruding from an opening (56') made on said plate (16).

6. The locking device according to claim 1, characterized in that the tool-holders (12) are inserted manually in the support body (14) with a horizontal orientation through as many seats (42).

7. The locking device according to claim 6, characterised in that the support body (14) houses, in combination with each of the tool-holders (12), a pawl (18) with threaded leadscrew (30) and a nut screw (36) inserted in said support body starting from respective openings (44).

8. The locking device according to claim 1, characterised in that it comprises a pair of proximity sensors (54) for motors (46), suitable to detect the stroke performed and thus the position reached by the pawls (18), moved vertically starting from the clockwise or anti-clockwise rotation imposed on the individual nut screws (36) by said motors (46), said sensors cooperating with the pin (56) of the pawls (18) and being constrained with nuts (58) to a support (60) in turn made integral with the plate (16) with screws (62).

9. The locking device according to claim 8, characterised in that said motors (46) are shielded by a protective cover (66) bearing on the upper face sequential reference and position numbers of the various tool-holders (12), said cover being stabilized on the plate (16) with allen screws (68).

10. The locking device according to claim 6, characterised in that the support body (14) is provided at the rear with connection means (64) for the passage of electrical cables actuating said motors (46) in connection with signals coming from the sensors (54).

* * * * *